United States Patent [19]
Butterfield

[11] 3,799,145
[45] Mar. 26, 1974

[54] SOLAR HEATING SYSTEM
[76] Inventor: Delwin W. Butterfield, Rt. 3, Twin Falls, Idaho 83301
[22] Filed: Sept. 21, 1972
[21] Appl. No.: 290,903

[52] U.S. Cl. ............................ 126/271, 237/1 A
[51] Int. Cl. .......................................... F24j 3/02
[58] Field of Search ............ 126/270, 271; 237/1 A

[56] References Cited
UNITED STATES PATENTS

| | | | |
|---|---|---|---|
| 1,747,826 | 2/1930 | Gould | 126/271 |
| 2,202,756 | 5/1940 | Cline | 126/271 |
| 2,553,302 | 5/1951 | Cornwall | 126/271 X |
| 3,236,294 | 2/1966 | Thomason | 126/271 X |
| 3,277,884 | 10/1966 | Rowekamp | 126/271 |
| 3,390,672 | 7/1968 | Snelling | 126/271 |

Primary Examiner—William F. O'Dea
Assistant Examiner—Peter D. Ferguson
Attorney, Agent, or Firm—John W. Kraft

[57] ABSTRACT

The solar heating system includes solar chambers each comprising a housing having a lens suitably mounted on the uppermost terminal side of the housing and a convection plate disposed parallel between the lens and the back wall of the housing operable to divide the heating chamber into a convection plenum and a heating chamber cavity which is operable to circulate fluid; reservoir means; and pumping means.

4 Claims, 5 Drawing Figures

PATENTED MAR 26 1974 3,799,145

SOLAR HEATING SYSTEM

FIELD OF INVENTION

The present invention relates to heating systems and more particularly to solar heating systems operable to circulate water.

DESCRIPTION OF THE PRIOR ART

Solar heating means have been largely restricted to experimental heating apparatus. Such heating apparatus commonly include tanks and reservoirs exposed to solar radiation, heat exchangers operable to transfer heat from heat-receiving panels to reservoirs, and the like. Most solar heating apparatus have been limited to the amount of fluid which could be heated and to the time required to heat the fluid to a desired temperature.

Accordingly, it is an object of the present invention to provide solar heating means for heating liquid fluids.

It is a further object of this invention to provide solar heating means of sufficient scale for heating relatively large areas, such as homes and buildings.

It is another object of this invention to provide storage means, auxiliary heating means, and circulating means in the solar heating system of this invention.

These and other objects shall become apparent from the description following, it being understood that modifications may be made without affecting the teachings of the invention here set out.

SUMMARY OF THE INVENTION

Generally, the solar heating system includes solar heating chambers each comprising a housing having a lens suitably mounted on the uppermost terminal side of the housing and a convection plate disposed parallel between the lens and the back wall of the housing operable to divide the heating chamber into a convection plenum and a heating chamber cavity which is operable to circulate fluid; reservoir means; and pumping means.

A more thorough and comprehensive understanding may be had from the detailed description of the preferred embodiment when read in connection with the drawings forming a part of this specification.

DETAILED DESCRIPTION OF THE PREFERRED EMBODIMENT

Figure 1:
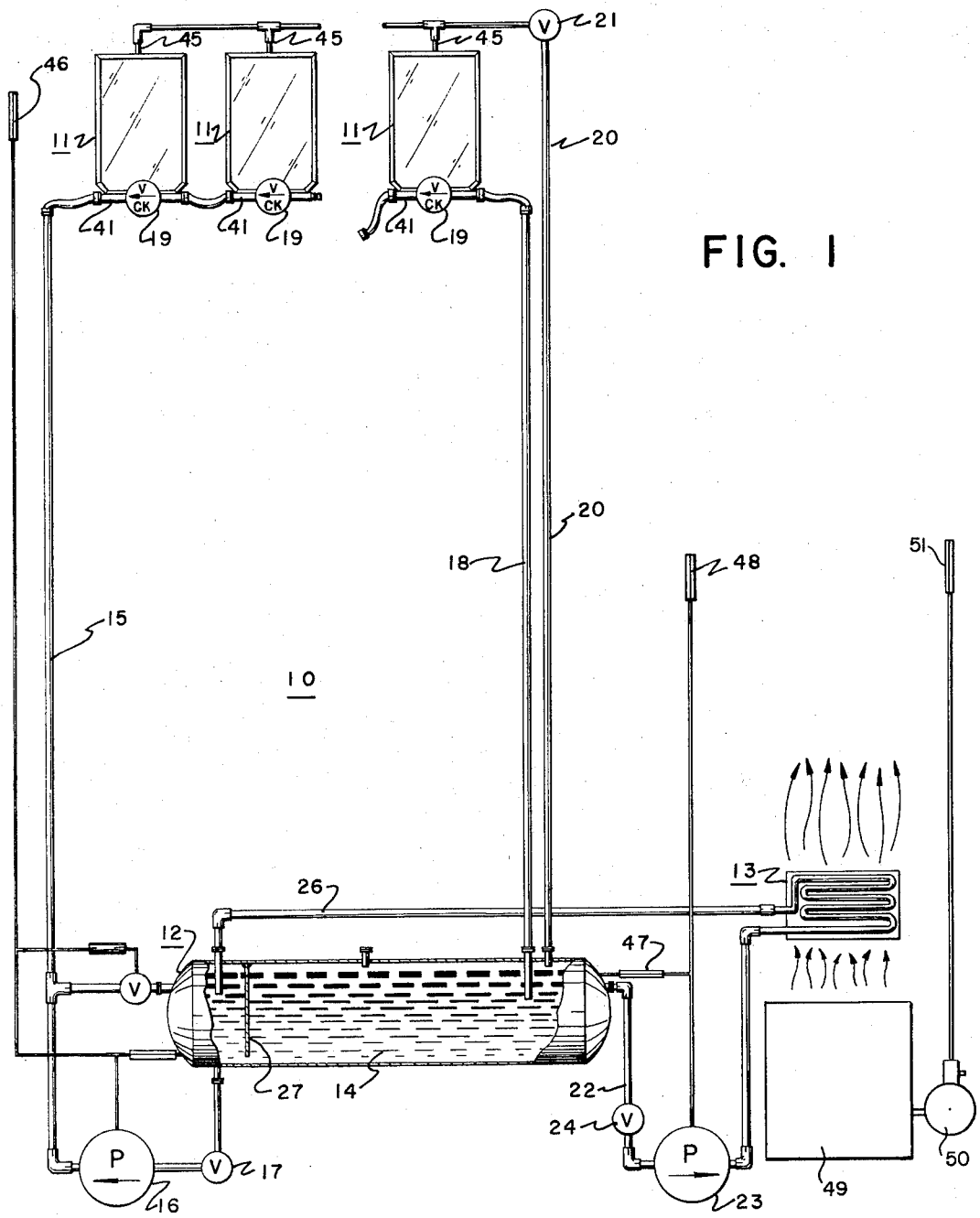
FIG. 1 is a side elevational view of the solar heating system of this invention with a commonly known supplemental heating unit shown in broken lines for illustrative purposes.
Figure 2:
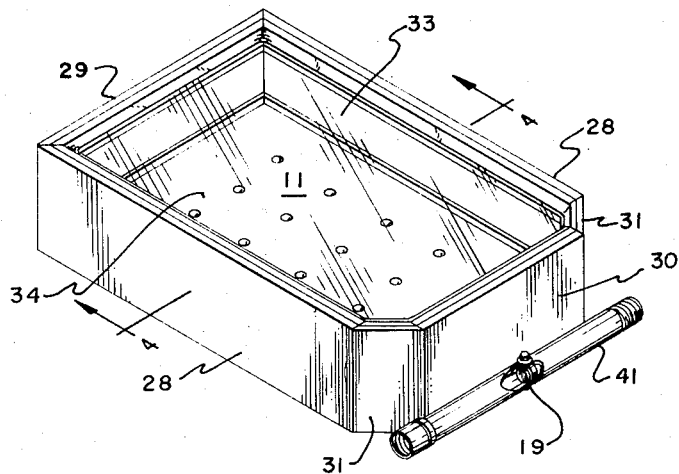
FIG. 2 is a left front perspective view of a typical heating chamber of this invention with a portion of the conduit's wall broken away for illustrative purposes.
Figure 3:
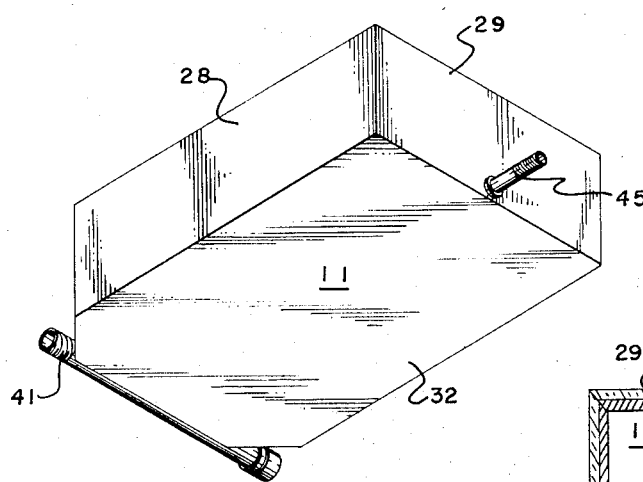
FIG. 3 is a bottom right perspective view of the apparatus of the FIG. 2.

Referring now to the drawings and more particularly to the FIG. 1, the solar heating system of this invention is shown to advantage and generally identified by the numeral 10. The solar heating system 10 includes a plurality of heating chambers 11, a reservoir 12, and radiation means 13. The reservoir 12 includes a tank 14 operable to hold fluid, such as water. The reservoir 12 is connected to the heating chambers 11 by means of fluid supply conduit 15 having a pump 16 and a valve control means 17. Heated water from the heating chambers 11 is returned to the tank 14 by means of a return conduit 18. It has been found to advantage to include a check valve 19 at each of the chambers 11 along the conduit 15. An auxiliary return conduit 20 is provided from the chambers 11 to the tank 14 as a venting means for the respective chambers 11. The conduit 20 may include a valve control means 21. Water heated by the chambers 11 and returned to the tank 14 may be utilized in any of a variety of ways, such as radiation heating means 13. In a heating system, fluid may be taken from the tank 14 through a conduit 22 having a suitable pump 23 and valve control means 24 to a heat radiator 25. Fluid may be recycled to the tank 14 by a suitable conduit 26. It has been found to advantage to expose the exitways of the conduits 18 and 20 and the entranceway of the conduit 22 at one end of the tank 14, and to expose the exitway of the conduit 26 and the entranceway of the conduit 15 at the end opposite to facilitate efficient heating and to minimize heat loss. To this end, it has also been found to advantage to include a wall 27 enclosing a transverse portion of the tank 14 distally from one of the terminal ends. It is to be understood that the reservoir 12 and the radiation means 13 may include suitable automatic thermostatic control means (not shown).

Referring now to the FIGS. 2, 3, 4, and 5, each heating chamber 11 includes a housing 11' having a pair of parallelly disposed side walls 28, a top wall 29 fastened at each of its terminal ends to the uppermost terminal ends of the walls 28, a bottom wall 30 disposed parallel to the top wall 29, and a pair of walls 31 inclined centrally toward the center of the bottom wall 30 and being fastened at their respective terminal ends to the lowermost terminal ends of the side walls 28 and to the respective terminal ends of the bottom wall 30. The housing 11' includes a back wall 32 fastened to the respective terminal edges of the walls 28, 29, 30 and 31. A heating chamber 11 may be conveniently divided into a convection plenum 34 and a heating chamber cavity 35. As shown in the FIGS. 2 and 4, the plenum 34 is enclosed by the walls 28, 29, 30 and 31 distally from the back wall 32. The plenum 34 is operable to form a chamber in which solar heat may heat air entrapped in the plenum 34 and may heat the convection plate 36. It is to be understood that the exterior walls 28, 29, 30 and 31 may include suitable refractory wall material lining.

Figure 4:
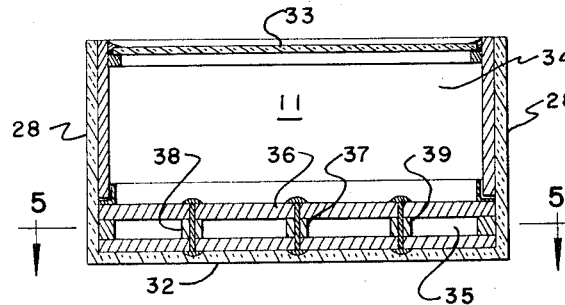
FIG. 4 is a cross-sectional view taken substantially along the lines 4—4 of the FIG. 2, showing to advantage an interior portion of the heating chamber.
Figure 5:
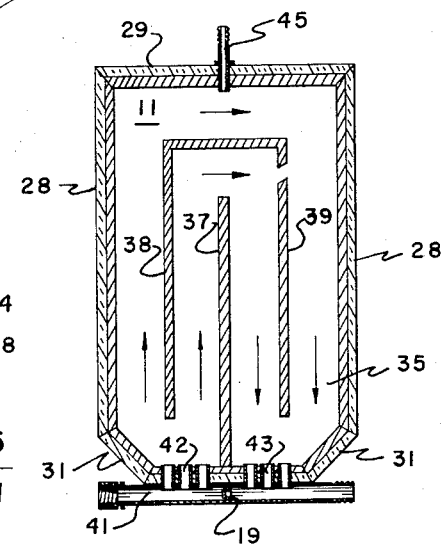
FIG. 5 is a cross-sectional view taken substantially along the lines 5—5 of the FIG. 4, showing the details of construction of the heating chamber.

Referring to the FIGS. 4 and 5, the heat exchanger cavity 35 is disposed between the back wall 32 and the convection plate 36. An upstanding channel wall 37 is perpendicularly fastened between the back wall 32 and the plate 36, centrally parallel between the walls 28, from the center of the bottom wall 30 to a point distally from the top wall 29. An upstanding, substantially inverted, L-shaped wall 38 is disposed centrally between the wall 37 and one of the side walls 28, and centrally between the uppermost end of the wall 36 and the top wall 29, and distally from the bottom wall 30. A wall 39 is disposed centrally between the wall 37 and the wall 28 from a point distally from the horizontally disposed leg of the L-shaped channel wall 38 to a point distally from the bottom wall 30. The heat exchanger cavity 35 of the heating chamber 11 is connected to the supply conduit 15 by means of a flexible conduit 41. The conduit 41 is operable to communicate fluid through its side walls to a portion of the heating cavity 35 defined by the walls 37, 38 and 28, the back wall 32, and the convection plate 36. The fluid is supplied to the cavity 35 though a plurality of conduit-like entranceways 42 disposed in the bottom wall 30. Furthermore, a plurality of exitways 43 are disposed adjacent the entranceways 42 through the bottom wall 30 and into the side walls of the conduit 41. A check valve 19 is disposed between the entranceways 42 and the exitways 43 in the conduit 41 to permit fluid to flow from the supply conduit 15 to subsequent heating chambers 11. As shown in the FIG. 5, fluid from the conduit 41 is operable to circulate through a portion of the heating cavity 35 between the walls 37, 38 and 28, through the cavity 35 and out of the channel-like portion defined by the walls 37, 39 and 28. Heat is transferred from the convection plenum 34 by contact of the fluid with the convection plate 36 and the walls 28, 38, 37, 39, and 28. It has been found to advantage to include a vent tube 45 disposed centrally in the top wall 29. The vents 45 of the heating chambers 11 are intended to be connected to the return conduit 20. In operation, as the heat cavity 35 is filled with fluid, the vent 45 and the return conduit 20 may be used to permit travel of pressurized air from the chamber 11 to the tank 14, and after air has been expelled from the heating chambers 11, the vent 45 may be closed by the valve 21 as set out above.

In operation, heating chambers 11 may be exposed to solar heat by facing the lens 33 of the convection plenum 34 toward the sun. Fluid may then be circulated through the chambers 11 by the pump 16 of the reservoir 12. Water heated by the solar heating system 10 may be utilized by means, such as the radiation means 13. It is to be understood that commonly known bimetalic thermostats 46, 47, and 48, shown in the FIG. 1, may be provided in the system, as well as a supplemental heating unit substantially as shown. A source of supplemental heat such as the gas burner 49 having a control 50 provided with a thermostat 51 may be placed adjacent the radiation means 13 to add additional heat to the system. In such an arrangement the supplemental heat would be added to fluid passing through the pipes from a conduit 22 through the radiation means 13 and through the conduit 26. Thus, it may be seen that the system 10 having the supplementary heating unit 49 may be used to accelerate heating of fluid in the system 10 to be maintained or increased by the heating chambers 11.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. A solar heating system including at least one solar heating chamber comprising a housing including a pair of parallelly disposed side walls, a top wall fastened at each of its terminal ends to the uppermost ends of said side walls, a bottom wall disposed parallel to said top walls and a pair of walls inclined centrally toward the center of said bottom wall and being fastened at the respective terminal ends to the terminal ends of said side walls and said bottom wall, and a back wall fastened to the terminal edges of said side walls, said top wall, said bottom wall and said inclined walls, said bottom wall having suitable fluid entranceways and exitways communicating fluid from a suitable source under pressure;

a lens suitably mounted in the edge opposite said back wall on said sidewalls, top wall, bottom wall and inclined walls of said housing;

a convection plate disposed parallel between said back wall and said lens, said convection plate dividing said heating chamber into a heating chamber cavity between said convection plate and said back wall and into a convection plenum between said convection plate and said lens; and upstanding channel walls fastened to said housing parallel to said side walls in said heating chamber cavity to suitably conduct fluid through said heating chamber.

2. The apparatus of claim 1 including a vent disposed in said top wall.

3. The apparatus of claim 1 including a multiplicity of said solar heating chambers connected by suitable conduits in series, and including certain reservoir means connected to the discharge of said chambers and suitable heat using means connected to a discharge conduit from said reservoir.

4. The apparatus of claim 3 wherein said heating system is provided with supplementary heating means and selectively controllable valve means.

* * * * *